(12) United States Patent
Juillard

(10) Patent No.: US 8,427,969 B1
(45) Date of Patent: *Apr. 23, 2013

(54) SYSTEM AND METHOD FOR CALCULATING PASSIVE HOST PROXIMITY IN AN L2 LINK LAYER

(75) Inventor: Loic Juillard, Escondido, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 310 days.

This patent is subject to a terminal disclaimer.

(21) Appl. No.: 12/576,906

(22) Filed: Oct. 9, 2009

Related U.S. Application Data

(63) Continuation-in-part of application No. 12/554,894, filed on Sep. 5, 2009.

(51) Int. Cl.
- G01R 31/08 (2006.01)
- G06F 11/00 (2006.01)
- G08C 15/00 (2006.01)
- H04J 1/16 (2006.01)
- H04J 3/14 (2006.01)
- H04L 1/00 (2006.01)
- H04L 12/26 (2006.01)

(52) U.S. Cl.
USPC ......... 370/252; 370/310.2; 370/328; 370/334

(58) Field of Classification Search .................. None
See application file for complete search history.

(56) References Cited

U.S. PATENT DOCUMENTS

| | | | |
|---|---|---|---|
| 7,113,782 B2 * | 9/2006 | Lucidarme | 455/432.1 |
| 7,366,507 B2 * | 4/2008 | Ammi et al. | 455/423 |
| 8,041,333 B2 * | 10/2011 | Hansen et al. | 455/404.2 |
| 2008/0311944 A1 * | 12/2008 | Hansen et al. | 455/517 |
| 2009/0059797 A1 * | 3/2009 | Northcutt et al. | 370/238 |
| 2011/0009132 A1 * | 1/2011 | Skarby et al. | 455/456.5 |
| 2011/0028093 A1 * | 2/2011 | Patel et al. | 455/41.2 |

* cited by examiner

*Primary Examiner* — Nishant B Divecha

(57) ABSTRACT

A system and method are provided for calculating passive host proximity in an environment of network-connected hosts. At least three controller hosts send inquiries to target hosts in the environment, including at least two passive (non-controller) hosts. A time interval is recorded between each inquiry and an associated response, and the recorded time intervals are converted into logical distance measurements between the controller host and each target host. The logical distance measurements are then used to calculate a logical distance between the two passive hosts. A logical triangle is constructed between a first controller host (H1) and the two passive hosts (S1, S2) using a first logical distance side (H1S1) having a known value, a second logical distance side (H1S2) having a known value, and a third logical distance side (S1S2) having an unknown value. Trigonometric relationships solve for the unknown value of the third logical distance side.

20 Claims, 10 Drawing Sheets

Logical Distance Matrix

| Host | a | b | c | ... n |
|------|------|------|------|------|
| a | — | 50ns | 17ns | 29ns |
| b | 50ns | — | 25ns | 100ns |
| c | 17ns | 25ns | — | 80ns |
| ⋮ | ⋮ | ⋮ | ⋮ | ⋮ |
| n | 29ns | 100ns | 80ns | — |

FIG. 3

SYSTEM AND METHOD FOR CALCULATING PASSIVE HOST PROXIMITY IN AN L2 LINK LAYER

RELATED APPLICATIONS

This application is a continuation-in-part of a pending application entitled, SYSTEM AND METHOD FOR CALCULATING PROXIMITY IN AN L2 LINK LAYER, invented by Loic Juillard, Ser. No. 12/554,894, filed Sep. 5, 2009, which is incorporated herein by reference.

BACKGROUND OF THE INVENTION

1. Field of the Invention

This invention generally relates to communication networks and, more particularly, to a system and method for accurately determining logical distances between network-connected passive host devices.

2. Description of the Related Art

In computer networking, the Link Layer (Layer 2 or L2) is a group of methods or protocols that only operate on a host's link. The link is the physical and logical network components used to interconnect hosts or nodes in the network, and a link protocol is a suite of methods and standards that operate only between adjacent network nodes.

Every host is a physical network node (i.e. a network device), but every physical network node is not necessarily a host. Network nodes such as modems and network switches are not assigned host addresses, and are not considered as hosts. As used herein, a passive host is a system connected to the network operating unaware of its proximity with its peers on the same Layer two network, and a controller or active host is a system connected to the network aware of its proximity with its peers located on the same L2 network. That is, a controller host is a computer system with related components capable of manipulating proximity measurements, calculations, or data. A system, as defined herein, is a device capable of executing software instructions to process, transport, and/or store data.

Despite the different semantics of layering in TCP/IP and OSI, the Link Layer is often described as a combination of the Data Link Layer (Layer 2) and the Physical Layer (Layer 1) in the Open Systems Interconnection (OSI) protocol stack. However, TCP/IP's layers are descriptions of operating scopes (application, host-to-host, network, and link) and not detailed prescriptions of operating procedures, data semantics, or networking technologies.

RFC 1122 exemplifies that local area network protocols such as Ethernet and IEEE 802, and framing protocols such as Point-to-Point Protocol (PPP) belong to the Link Layer. Some examples of Link Layer protocols include: Address Resolution Protocol (ARP), Reverse ARP (RARP), Neighbor Discovery Protocol (NDP), Open Shortest Path First (OSPF), Tunnels (L2TP), PPP, and Media Access Control (Ethernet, MPLS, DSL, ISDN, FDDI).

LAN standards such as Ethernet and IEEE 802 specifications use terminology from the seven-layer OSI model rather than the TCP/IP reference model. The TCP/IP model in general does not consider physical specifications, rather it assume a working network infrastructure that can deliver media level frames on the link. Therefore, RFC 1122 and RFC 1123, the definition of the TCP/IP model, do not discuss hardware issues and physical data transmission and set no standards for those aspects, other than broadly including them as Link Layer components. It is assumed herein that physical data transmission aspects are part of the Link Layer, and that a hardware layer or physical layer exists below the link layer.

The link layer includes logical link-local networking methods such as the encapsulation of IP packets into frames, frame synchronization, packet error detection, node flow control, Media access control (MAC) sublayer collision avoidance, Physical addressing (MAC addressing), and LAN switching (packet switching) including MAC filtering and spanning tree protocol, to name a few.

The Link Layer Discovery Protocol (LLDP) is a vendor-neutral Layer 2 protocol used by network devices for advertising of their identity and capabilities on the local network. The protocol was formally ratified as IEEE standard 802.1AB-2005 in May 2005. Information gathered with LLDP is stored in the device and can be queried with the Simple Network Management Protocol (SNMP). The topology of an LLDP-enabled network can be discovered by "crawling" the hosts and querying this database. Information that may be retrieved includes: system name and description, port name and description, IP management address, system capabilities (switching, routing, etc.), and MAC/PHY information.

The Spanning Tree Protocol (STP) is a link layer network protocol that ensures a loop-free topology for any bridged LAN. Spanning tree allows a network design to include spare (redundant) links to provide automatic backup paths if an active link fails, without the danger of bridge loops, or the need for manual enabling/disabling of these backup links. Bridge loops must be avoided because they result in flooding the network. STP is defined in the IEEE Standard 802.1D. As the name suggests, it creates a spanning tree within a mesh network of connected layer-2 bridges (typically Ethernet switches), and disables those links that are not part of the tree, leaving a single active path between any two network nodes.

FIG. 1 is a schematic diagram depicting an exemplary network (prior art). The collection of bridges in a LAN can be considered a graph whose nodes are the bridges, and whose edges are the cables connecting the bridges. To break loops in the LAN while maintaining access to all LAN segments, the bridges collectively compute a spanning tree. The spanning tree that the bridges compute using the Spanning Tree Protocol can be determined using rules.

For example, the numbered boxes represent bridges (the number represents the bridge ID), and the lettered clouds represent network segments. Assuming that bridge with the smallest bridge ID is the root bridge, the root bridge is 3. Assuming that the cost of traversing any network segment is 1, the least cost path from bridge 4 to the root bridge goes through network segment c. Therefore, the root port for bridge 4 is the one on network segment c. The least cost path to the root from network segment e goes through bridge 92. Therefore the designated port for network segment e is the port that connects bridge 92 to network segment e. Any active port that is not a root port or a designated port is a blocked port. Different technologies have different default costs for network segments. An administrator can configure the cost of traversing a particular network segment. By establishing a unique data path between hosts, spanning tree guaranties that the data transfer latency will remain constant over time. The effective latency is therefore the sum of the propagation time over the cabling infrastructure and the network traffic handling latency.

The above-described rules are one way of determining what spanning tree will be computed by the algorithm, but the rules as written imply knowledge of the entire network. The bridges have to determine the root bridge and compute the port roles (root, designated, or blocked) with only the information that they have. To ensure that each bridge has enough information, the bridges use special data frames called Bridge Protocol Data Units (BPDUs) to exchange information about bridge IDs and root path costs. A bridge sends a BPDU frame using the unique MAC address of the port itself as a source address, and a destination address of the STP multicast address 01:80:C2:00:00:00.

There are three types of BPDUs: Configuration BPDU (CBPDU), used for Spanning Tree computation, Topology Change Notification (TCN) BPDU, used to announce changes in the network topology, and Topology Change Notification Acknowledgment (TCA). BPDUs are exchanged regularly (every 2 seconds by default) and enable switches to keep track of network changes and to start and stop forwarding at ports as required.

When a device is first attached to a switch port, it will not immediately start to forward data. It will instead go through a number of states while it processes BPDUs and determines the topology of the network. When a host is attached such as a computer, printer, or server the port will always go into the forwarding state, albeit after a delay of about 30 seconds while it goes through the listening and learning states. The time spent in the listening and learning states is determined by a value known as the forward delay (default 15 seconds and set by the root bridge). However, if instead another switch is connected, the port may remain in blocking mode if it is determined that it would cause a loop in the network. Topology Change Notification (TCN) BPDUs are used to inform other switches of port changes. TCNs are injected into the network by a non-root switch and propagated to the root. Upon receipt of the TCN, the root switch will set a Topology Change flag in its normal BPDUs. This flag is propagated to all other switches to instruct them to rapidly age out their forwarding table entries. Rapid Spanning Tree Protocol (RSTP) provides for faster spanning tree convergence after a topology change (IEEE 802.1D-2004). While STP can take 30 to 50 seconds to respond to a topology change, RSTP is typically able to respond to changes within a second.

While there is currently a service on the Internet which provides a rough geo-localization function using IP Internet control Message Protocol (ICMP) services, there are no link layer algorithms that provide a means of determining host proximity, as measured by time or cable length.

For example, two customers are co-located on a storage filer: Customer A and Customer B. The storage system heads uses FCOE (Fiber Channel Over Ethernet) to communicate with the disk shelve. The overall unit is not collocated in the same racks because of typical power constraints. Instead, the shelves are spread between multiple MDFs (main distribution frames) within the data center. Conventionally, the service is assigned by the storage management device to the system requiring the service. In this case Customer A is physically located 50 and 200 ft from two data center centralized storage units, and Customer B is physically located 100 ft and 50 ft from the units.

Ethernet network packet routing is dynamic, as different events on the network can redirect the traffic to different path. For example, if Customer A is initially 50 ns from the filer, it may over time be rerouted to a different, less efficient path. This change may be caused by a less efficient cable routing, or a redundant protocol (such as spanning tree) convergence.

Practically, operational teams do not look at the exact logical location of the device and they typically assume that if devices are physical close, they must be logical close (connected via the shortest or fastest possible route). However as noted above, this assumption is not always correct. Conventionally, the logical distance between hosts can only be calculated by installing an agent on each host, which reports on network latencies and conditions. Such an agent would have to be compatible with the specific OS and hardware running on this system.

Conventional storage implementations rely on either an IP or Fiber channel for the connectivity between the hosts and shelves. Applications using the filer can be classified in two categories:

Performance: requiring storage volume to replicate the behavior of a local drive with low latency and high throughput where Fiber channel is widely used.

Access: typically implemented over IP such as iSCSI and NFS.

With the introduction of SSD technology, hard drive access time has been reduce from 4-8 millisecond (ms), to less than 1 ms. Going forward, the access time is likely to eventually drop to the 10-20 nanosecond (ns) range. Network latency in a LAN is caused (in an undersubscribed network) by the propagation of light and general switching/routing speed. Light travels roughly at 1 foot per nanosecond through cable. With data center cabling averaging 200 feet: the network-induced latency will become a major part of the total access time latency. A number of companies have also implemented L2MPLS between facilities: in this condition the L2 Ethernet environment within a sub-network is expended geographically with latency similar to the one seen on WAN networks (10 ms to 350 ms and more).

It will, therefore, be advantageous to put in place a mechanism to optimize service allocation based on the quality of service requested and the proximity of the storage system to the requestor.

It would be advantageous if there was a method to accurately determine the network distance (in time) and latency between networks passive hosts in a Layer two Ethernet environment.

SUMMARY OF THE INVENTION

Disclosed herein is a system and method for measuring the logical distance between passive hosts in a link layer (L2) environment. The invention might be practiced, for example, in a data center environment to characterize and optimize network service offering by assigning resources to the closest host available. More explicitly, a native Layer 2 Ethernet MAC address resolution protocol is used to directly measure the latency to controller hosts. The inferred latency between passive hosts is computed based upon the latency between 3 controller hosts located in the same L2 environment. This process relies upon the following intrinsic properties of a L2 environment:

data containers in an L2 network take the shortest available path between two given hosts;

Only a single L2 path is available between two hosts in a stable environment. Therefore, traffic latency between hosts is predictable.

This process is applicable in any client/server application such as web application, Storage, Network Load balancers. Once the system has determined the distance between peer hosts, it can initiate requests to the closest (network latency wise) device, hence, improving the overall system performance. The process can be implemented without installing an agent on each host to report on network latencies, regardless of the specific operating system (OS) and system hardware in use.

Accordingly, a method is provided for indirectly calculating proximity between passive hosts in an environment including network-connected hosts. At least three controller hosts send inquiries to target hosts in an environment that includes at least two passive (non-controller) hosts. A time interval is recorded between each inquiry and an associated response, and the recorded time intervals are converted into logical distance measurements between the controller host and each target host. The logical distance measurements are then used to calculate a logical distance between the two passive hosts.

More explicitly, a logical triangle is constructed between a first controller host (H1) and the two passive hosts (S1, S2) using a first logical distance side (H1S1) having a known value, a second logical distance side (H1S2) having a known value, and a third logical distance side (S1S2) having an unknown value. Then, trigonometric relationships are used to solve for the unknown value of the third logical distance side. If S1 and S2 are on the same side of a logical distance side H1H2, $\alpha1=\alpha3-\alpha2$ is found, where $\alpha1$ is the angle formed by logical distance sides H1S1 and H1S2, and where $\alpha2$ is the angle formed by logical distance sides H1H2 and H1S1, and H2 is a second controller host. ($\alpha3$) is the angle formed by logical distance sides H1H2 and H1S2. Alternately, if S1 and S2 are on opposite sides of the logical distance side H1H2, $\alpha1=\beta3+\alpha2$ is found. Knowing $\alpha1$, H1S1, and H1S2, it is possible to solve for S1S2.

Additional details of the above-described method and a controller host indirectly calculating proximity between passive hosts are provided below.

BRIEF DESCRIPTION OF THE DRAWINGS

FIG. 3 is a diagram depicting an exemplary logical distance matrix.

DETAILED DESCRIPTION

As used in this application, the terms "component," "module," "system," and the like are intended to refer to an automated computing system entity, such as hardware, firmware, a combination of hardware and software, software, software stored on a computer-readable medium, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 2:
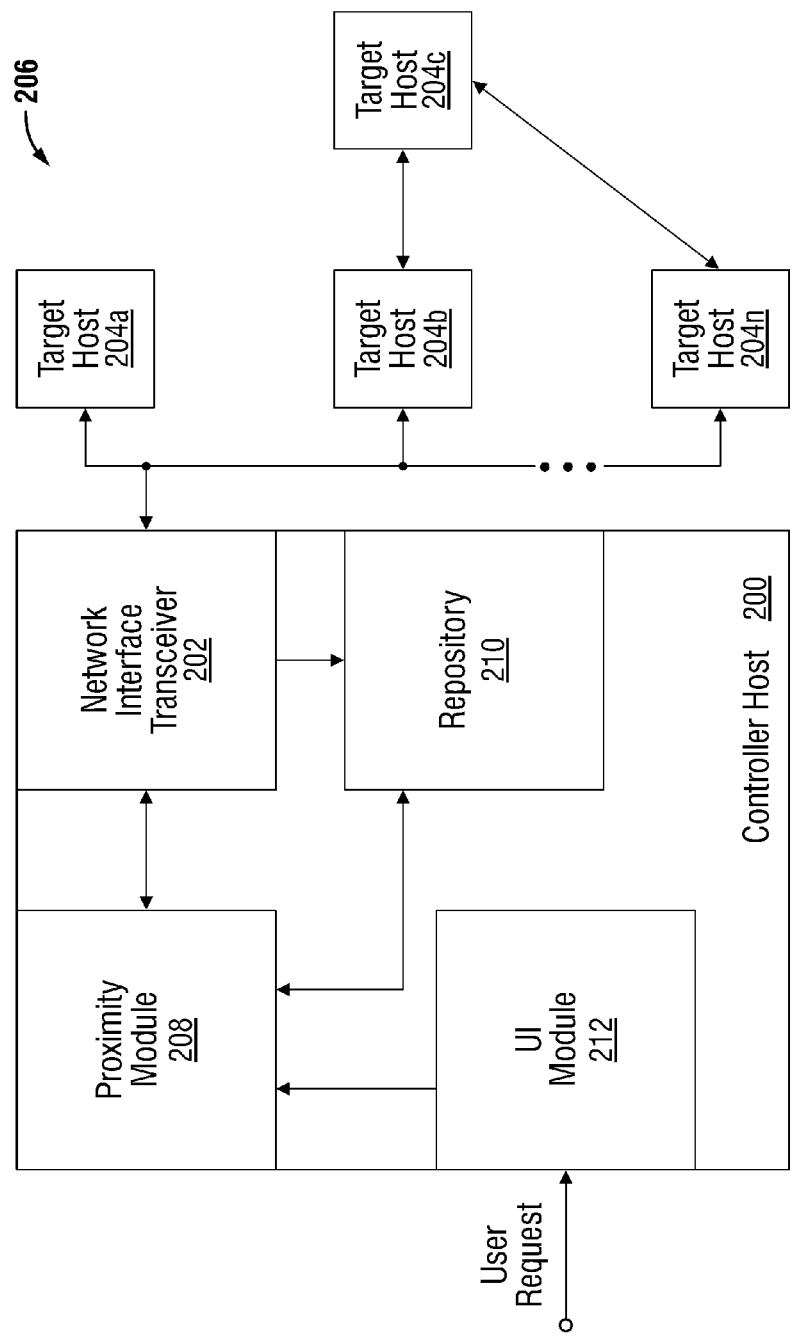
FIG. 2 is a schematic block diagram of a controller host calculating host proximity in an environment of network-connected hosts.

FIG. 2 is a schematic block diagram of a controller host calculating host proximity in an environment of network-connected hosts. The controller host 200 comprises a network interface transceiver 202 for sending inquiries to target hosts 204 in an environment 206 of network-connected hosts. Shown are target hosts 204a through 204n, where n is a variable not limited to any particular value. The target hosts 204 may be other controller hosts and passive (non-controller) hosts.

In one aspect, the proximity module 208 initiates inquiries to target hosts at a predetermined time interval. Alternately, the proximity module 208 may send inquires to a plurality of hosts in response to a new host joining the environment. In another aspect, inquires are sent to a host having a longest logical distance at a predetermined time interval. In a different aspect, inquiries are sent to a plurality of hosts in response to a Spanning Tree Bridge Protocol Data Unit (BPDU) bridge change, or in response to a change in logical distance to a gateway host. As used herein, a gateway host is a network node equipped for interfacing with another network that uses a different, protocol. For example, a router may be a gateway host. Alternately expressed, the network gateway is the necessary host all the devices need to go through, to access hosts located in a distinct L2 environment. If the latency to this host abruptly changes, it is a likely indicator that a network event has occurred.

Practically, it may be advantageous to update logical distance measurements every 5-10 seconds. There are a number of events that an active host can pick up, which may require updated measurements, such as:

New clients joining the network characterized by a new MAC address added to the ARP table;

By probing the furthest host regularly: it is likely that if a dynamic re-convergence occurs, the host located the further from the active node will be impacted;

By probing the gateway MAC address and triggering a full table update if the latency to the gateway has changed substantially.

Further, convergence, which pertains to a routing protocol such as spanning tree protocol, can be used to characterize the time interval between an event on the network that triggered a logical topology change and the time when the protocol has established a new stable logical topology.

A proximity module 208 records a time interval between each inquiry and an associated response, and calculates a logical distance between the controller host 200 and each target host 204. The logical distance is defined herein as the time it takes to send (or receive) a message from a target host. Thus, the logical distance is a measure of host proximity based upon communication times.

Figure 1:
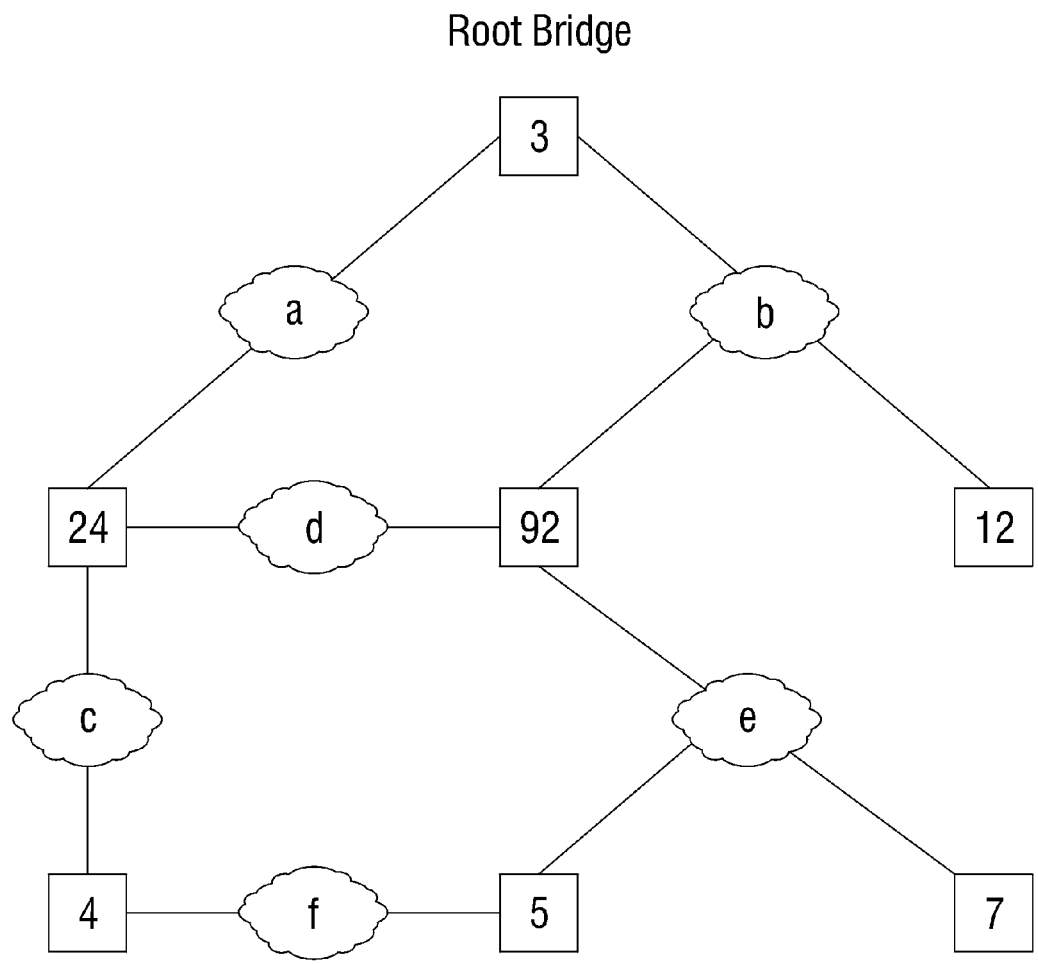
FIG. 1 is a schematic diagram depicting an exemplary network (prior art).

More explicitly, the proximity module 208 calculates time intervals, where a time interval is the time it takes to send a message from the controller host to a target host via a shortest network path. In one aspect, the proximity module 208 calculates the logical distance between the controller host and a first target host by: recording a start time; directing the transceiver to send an inquiry to the first target host; receiving confirmation from the transceiver that an inquiry response has been received from the first target host; recording a stop time; and, dividing the difference between the start and stop times by 2. For example, the transceiver 202 may send Layer 2 (L2) Ethernet Address Resolution Protocol (ARP) messages to the target hosts. That is, the transceiver 202 uses an ARP protocol to send ARP messages to target hosts 204 and receive ARP responses via a current active path (see FIG. 1).

In one aspect as shown, the controller host 200 includes a local memory repository 210. The transceiver 202 may accept logical distance calculations between hosts, from a plurality of controller hosts in the environment. For example, hosts 202a and 202b may be controller hosts. The proximity module 208 accepts the logical distance calculations for each controller host and stores the calculations in the repository 210 as a matrix of host IDs cross-referenced to logical distances. Although not explicitly shown, each controller in the environment 206 may include a repository with a logical distance matrix.

FIG. 3 is a diagram depicting an exemplary logical distance matrix. Here, the logical distance between hosts is represented in units of time.

Returning the FIG. 2, the controller host may further comprise a user interface (UI) module 212 to accept a user service request requiring the cooperation of multiple hosts. The proximity module 208 determines host combinations providing the requested user service, and accesses the repository to discover the host combination with the shortest logical distance between hosts. For example, the proximity module may determine that either the combination of hosts 204b and 204c, or 204n and 204c can support the requested service. After discovering that the combination of hosts 204n and 204c has a shorter logical distance, the UI module 212 supports the requested user service using the discovered host combination. In one aspect, the UI module 212 accepts a user service request with a requested quality of service (QoS), and the proximity module 208 discovers the shortest logical distance in response to the requested QoS.

Figure 4:
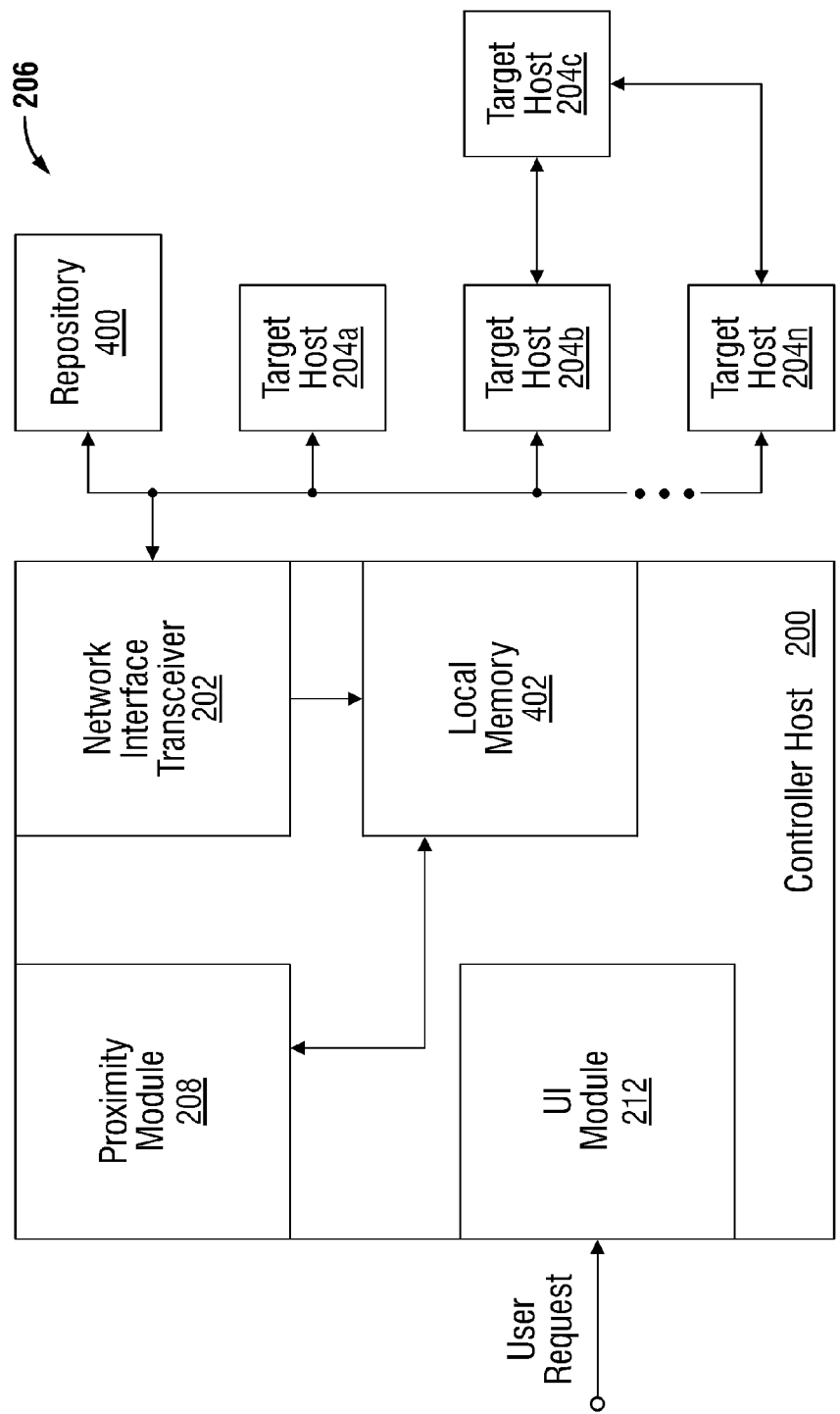
FIG. 4 is a schematic diagram depicting a variation of the environment of FIG. 2.

FIG. 4 is a schematic diagram depicting a variation of the environment of FIG. 2. In this aspect, the proximity module 208 sends the logical distance calculations to a network-connected central repository 400, and receives logical distance measurements calculated by other controller hosts in the environment. The logical distance calculations for a plurality of controller hosts are stored in the central repository as matrix of host IDs cross-referenced to logical distances. If the controller host UI module 212 accepts a user service request requiring the cooperation of multiple hosts, the proximity module may determine host combinations providing the requested user service, as described above. However, in this aspect the proximity module 208 accesses the repository matrix 400 to discover the host combination with the shortest logical distance between hosts, so that the UI module 212 supports the requested user service using the discovered host combination. Alternately, the repository may distribute the matrix, or portions of the matrix, upon request or at regular intervals. The distributed matrix can be stored in controller host local memory 402.

Figure 5:
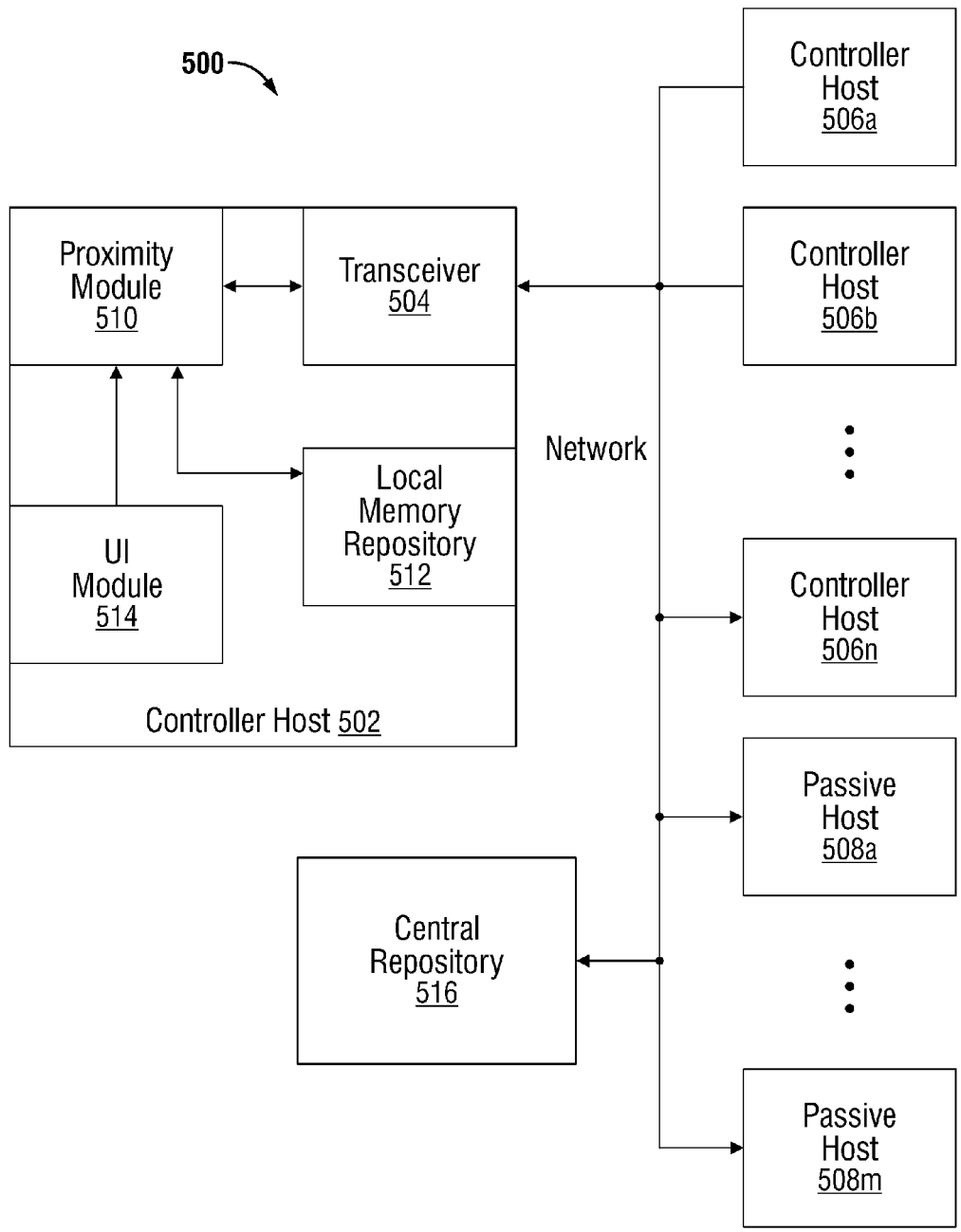
FIG. 5 is a schematic block diagram depicting a controller host indirectly calculating proximity between passive hosts in an environment including network-connected hosts.

FIG. 5 is a schematic block diagram depicting a controller host indirectly calculating proximity between passive hosts in an environment 500 including network-connected hosts. The controller host 502 comprises a network interface transceiver 504 for sending inquiries to target hosts in an environment including at least three network-connected controller hosts 506 and at least two network-connected passive (non-controller) hosts 508. Controller hosts 506a through 506n, and passive hosts 508a through 508m are shown, where n and m are variables not limited to any particular value. The transceiver 504 receives logical distances measurements made by other controller hosts 506 in the environment 500.

A proximity module 510 records a time interval between each inquiry and an associated response, and converts the recorded time intervals into logical distance measurements between the controller host 502 and target hosts 506 and 508. The proximity module 510 calculates a logical distance between two passive hosts 508a and 508b using the measured and received logical distances. The proximity module 510 measures the time it takes to send a message from the controller host 502 to a target host 506/508 via a shortest network path. In one aspect, the transceiver 504 sends Layer 2 (L2) Ethernet Address Resolution Protocol (ARP) messages to the target hosts 506/508. One advantage of the system depicted in FIG. 5 is that it may rely upon the foundational of a MAC/Ethernet protocol that will always work, regardless of the environment. If a host does not resolve ARP queries, it cannot communicate via the network.

A controller host may employ a computer system with a bus or other communication mechanism for communicating information, and a processor coupled to the bus for processing information. The computer system may also includes a main memory, such as a random access memory (RAM) or other dynamic storage device, coupled to the bus for storing information and instructions to be executed by processor. These memories may also be referred to as a computer-readable medium. The execution of the sequences of instructions contained in a computer-readable medium may cause a processor to perform some of the steps associated with proximity calculation. Alternately, these functions, or some of these functions may be performed in hardware. The practical implementation of a controller host as a computer system would be well known to one with skill in the art.

As used herein, the term "computer-readable medium" refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

The network through which the transceiver 504 communicates may be a local network associated with a host computer, or to data equipment operated by an Internet Service Provider (ISP). The ISP may provides data communication services through the world wide packet data communication network (Internet) using electrical, electromagnetic, or optical signals that carry digital data streams.

Figure 6:
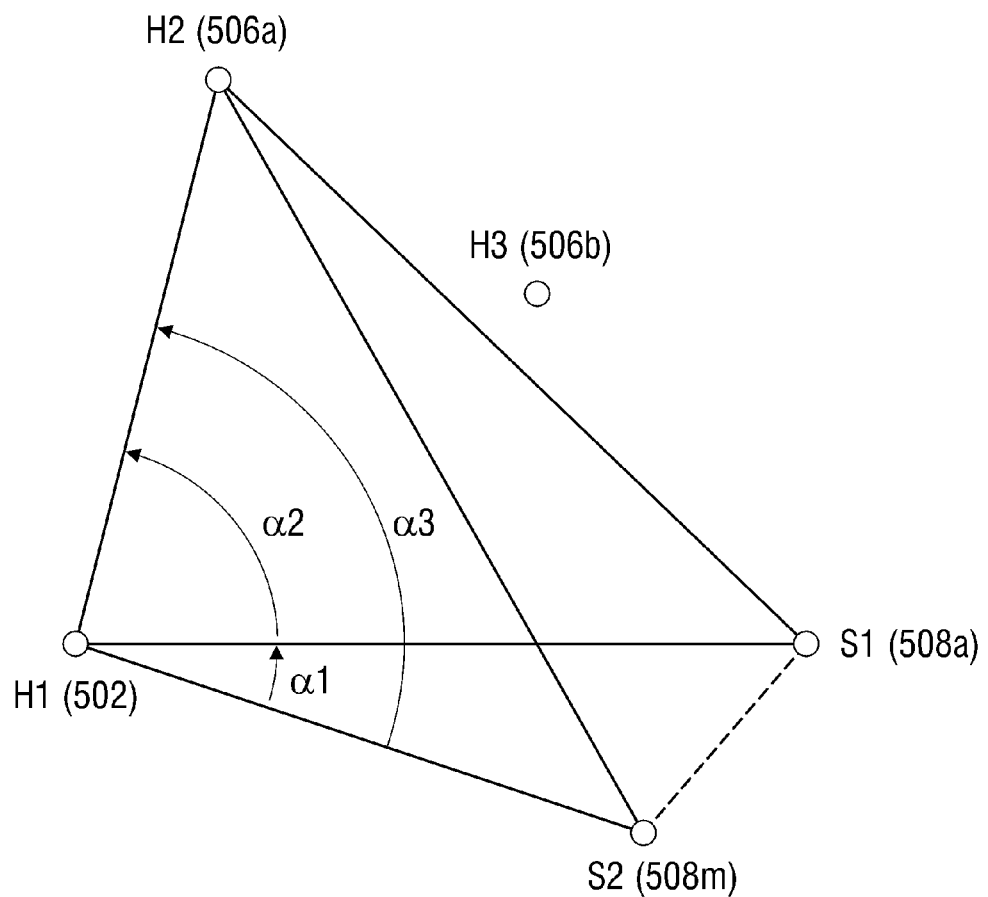
FIG. 6 is a diagram of the environment of FIG. 5, depicting the logical distance between host devices.

FIG. 6 is a diagram of the environment of FIG. 5, depicting the logical distance between host devices. Generally, the proximity module calculates the logical distance between the two passive hosts by constructing a logical triangle between a first controller host (H1) and the two passive hosts (S1, S2) using a first logical distance side (H1S1) having a known value, a second logical distance side (H1S2) having a known value, and a third logical distance side (S1S2) having an unknown value. Using trigonometric relationships normally associated with physical distance, the unknown value of the third logical distance side, in actuality a time delay value, can be determined.

In this example, the first controller host H1 may be controller host 502 of FIG. 5. Likewise, H2 and H3 may be controller hosts 506a and 506b of FIG. 5, respectively, and S1 and S2 may be passive hosts 508a and 508m, respectively.

The logical distances measured by H3 to H1, H2, S1, and S2 can be used to determine if S1 and S2 are on the same side of the logical side formed by H1H2 (as shown). Formulas to make this determination are well known in the field of trigonometry. If S1 and S2 are on the same side of a logical distance side H1H2, then α1=α3−α2 is found.

(α1) is the angle formed by logical distance sides H1S1 and H1S2;

(α2) is the angle formed by logical distance sides H1H2 and H1S1; and,

α3 is the angle formed by logical distance sides H1H2 and H1S2.

Likewise, if S1 and S2 are on opposite sides of the logical distance side H1H2 (not shown), α1=α3+α2 is determined. Either way, once α1, H1S1, and H1S2 are known, it is possible to solve for S1S2.

The proximity module solves for α2 knowing logical distances H1S1, H1H2, and H2S1. More explicitly, the proximity module solves for α2 knowing logical distances H1S1, H1H2, and H2S1 as follows:

$$\cos(\alpha 2)=((H1S1)^2+(H1H2)^2-(H2S1)^2)/(2(H1S1)(H1H2))$$

(α3) is determined knowing logical distances H1S2, H1H2, and H2S2 as follows:

$$\cos(\alpha 3)=((H1S2)^2+(H1H2)^2-(H2S2)^2)/(2(H1S2)(H1H2)).$$

Knowing α2 and α3, α1 can be determined. Since α1, H1S1, and H1S2 are all known, it is possible to solve for S1S2 as follows:

$$(S1S2)^2=(H1S2)^2+(H1S1)^2-2(H1S2)(H1S1)(\cos(\alpha 1)).$$

It should be understood that the same result can be achieved using corollaries and well known variations of the above-referenced formulas to find a logical distance between hosts using a combination of logical distance (time delay) and angles. For example, the above formulas use H2S1 as a known value. Equivalent formulas may also be used based upon the use of H2S2 being a known value.

Returning to FIG. 5, in one aspect the controller host 502 includes a local memory repository 512 that stores the received logical distance measurements made by other controller hosts 506 in the environment 500. The repository also holds proximity module 510 calculations. Both types of data are kept as a matrix of host IDs cross-referenced to logical distances (see FIG. 3).

In another aspect, the controller host 502 includes a user interface (UI) module 514 for accepting a user service request requiring the cooperation of multiple passive hosts. The proximity module 510 determines host combinations providing the requested user service, and accesses the local memory repository 512 to discover the host combination with the shortest logical distance between passive hosts. Then, the UI module 514 is able to support the requested user service using the discovered host combination. For example, the UI module 514 may accept a user service request with a requested quality of service (QoS), and the proximity module 510 discovers the shortest logical distance in response to the requested QoS.

Alternately, the transceiver 504 transmits logical distance measurements to a network-connected central repository matrix 516 of host IDs, cross-referenced to logical distance measurements. The proximity module 510 determines host combinations providing the requested user service, accesses the central repository matrix 516 to download measured logical distances, and discover the host combination with the shortest logical distance between passive hosts. Then, the UI module 514 supports the requested user service using the discovered host combination.

Although the proximity calculation has been explained from the perspective of controller host 502, it should be understood that in one aspect that all the controller hosts (506a through 506n) in the environment are capable of performing the same proximity calculations.

Functional Description

With relatively slow host access times (e.g., milliseconds (ms)), the difference between physical and logical distances (e.g., ns) can be ignored. For example, current storage implementation relies on either IP or Fiber channel for the connectivity between the controller and passive hosts. Where Fiber channel is used, storage volume is required to replicate the behavior of a local drive with low latency and high throughput, and access is typically implemented over IP such as iSCSI and NFS. However, with the introduction of solid state drive (SSD) technology, hard drive access time has been reduce from 4-8 ms to less than 1 ms. Going forward, access times are likely to drop to the 10-20 ns range.

Network latency in a LAN is caused (in an undersubscribed network) by the propagation of light and general switching/routing speed. Messages at the speed of light travel at about 1 foot per nanosecond. With data center cabling averaging 200 feet, the network induced latency will become a major part of the total access time latency. A number of companies have also implemented L2 multiprotocol label switching (MPLS) between facilities. In this condition the L2 Ethernet environment within a sub-network is expended geographically with latency similar to the one seen on WAN networks (10 ms to 350 ms, and more).

It will therefore become critical to put in place a mechanism to optimize service allocation based on the quality of service requested and the proximity of the storage system to the requestor. While the aim of geo-localization is to provide an accurate physical location for an object or person (e.g., GPS, Cell phone localization, or Google IP localization), the above-described system quantifies the logical distance (or latency) between two hosts regardless of their physical proximity.

As noted above, native Layer 2 Ethernet MAC address resolution protocol can be used to determine the latency with respect to another device. This protocol does not require the running of a special agent on the targeted hosts. That is, existing ARP resolution is used to determine the logical distance between the two hosts.

Figure 7:
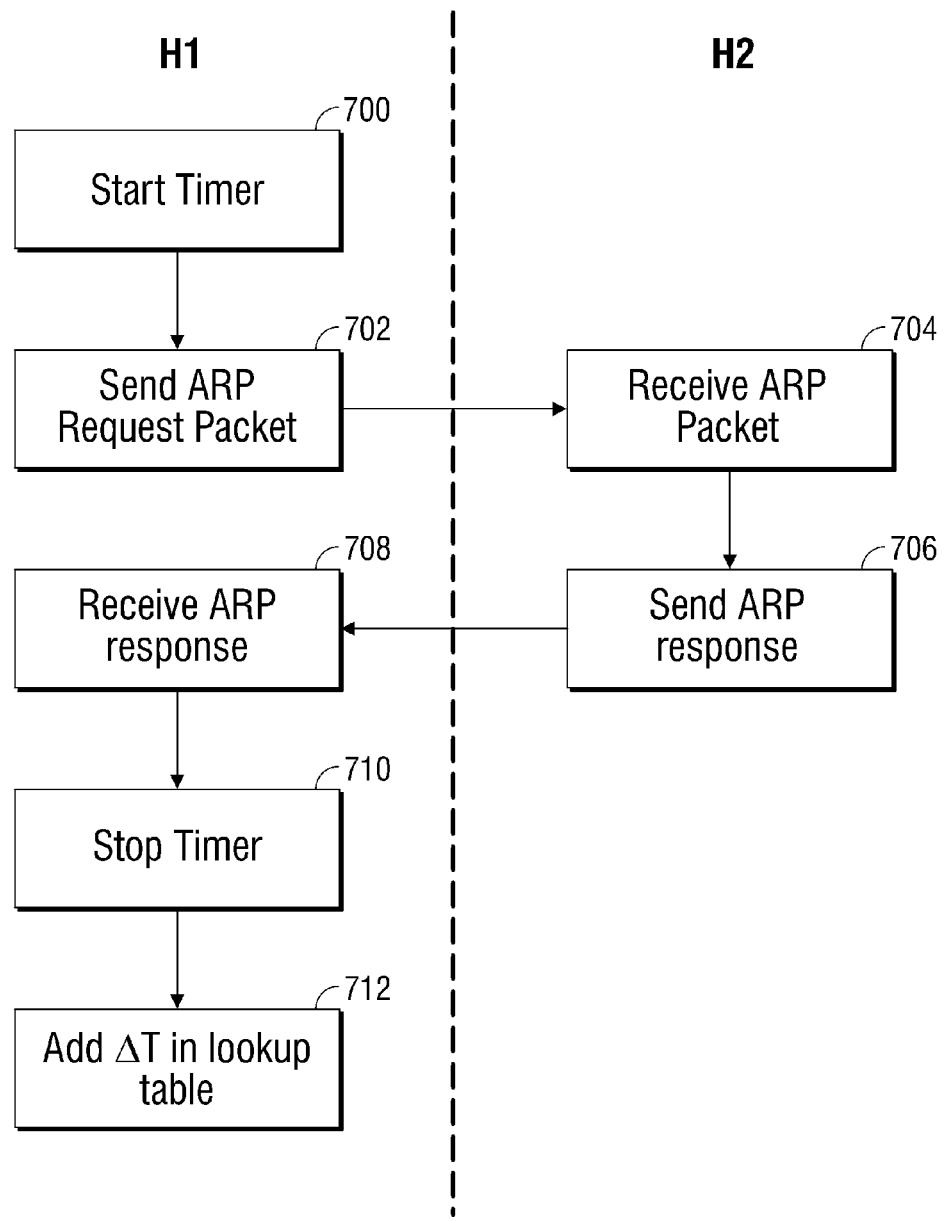
FIG. 7 is a logic flowchart illustrating the calculation of logical distance.

FIG. 7 is a logic flowchart illustrating the calculation of logical distance. As another example, hosts H1 and H2 are in the same L2 Ethernet Environment in a Data Center. In Step 700, H1 starts a timer. In Step 702, H1 send an ARP request for the IP address of H2. In Step 704, H2 receives the ARP request packet. In Step 706, H2 responds to the request with its MAC address. In Step 708, H1 receives the response from H2 and stops the timer in Step 710. The delta t represents the time elapsed between the stimulus and response. By dividing the time in half (Step 712), H1 calculates the logical distance or latency in ns between the two hosts.

Generally, the methodology can be applied in any client/server application such as a web application, Storage, or Network Load balancers. Once the system has determined the distance between himself and its peers, it is able to initiate requests to the closest (network latency-wise) device, improving the overall system performance.

Figure 8:
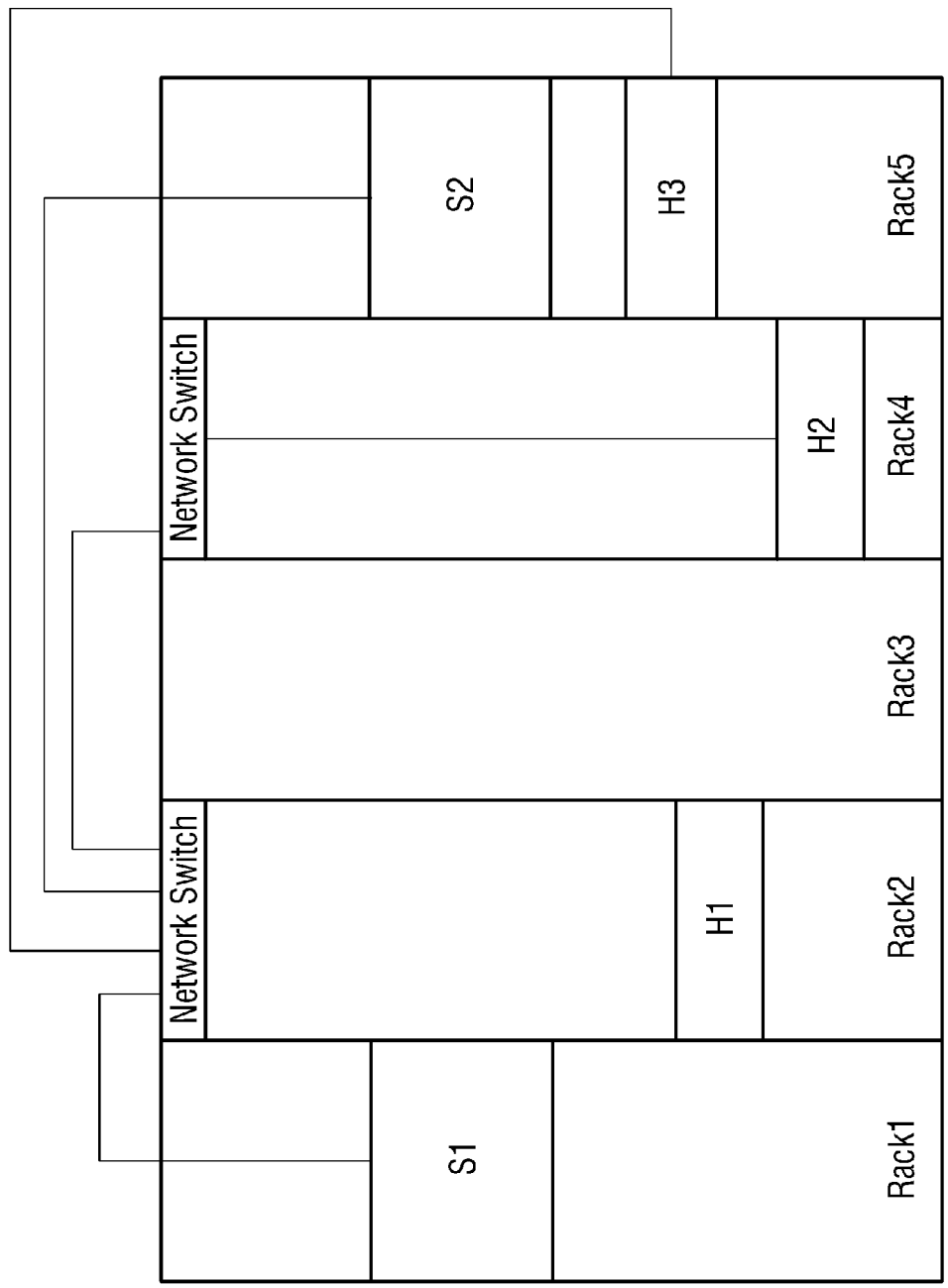
FIG. 8 is a schematic block diagram depicting exemplary equipment cabling between controller and passive hosts.

FIG. 8 is a schematic block diagram depicting exemplary equipment cabling between controller and passive hosts. Using the notation of FIG. 6, the controller hosts are H1, H2, and H3. The passive hosts are S1 and S2. Leveraging the procedures defined in the direct measurement of L2 latency, the logical distance between S1 and S2 can be determined assuming that the ARP latency protocols have already determined the latency between controller hosts (e.g., between H1, H2, and H3), and between the controller hosts and passive hosts (e.g., between $H_n$ and $S_m$).

Table 1 summarizes the latencies or logical distances between the hosts of FIG. 8.

TABLE 1

| From - To | H1 | | | | |
|---|---|---|---|---|---|
| H2 | 60 | H2 | | | |
| H3 | 70 | 60 | H3 | | |
| S1 | 80 | 100 | 40 | S1 | |
| S2 | 90 | 110 | 40 | TBD | S2 |

Figure 9:
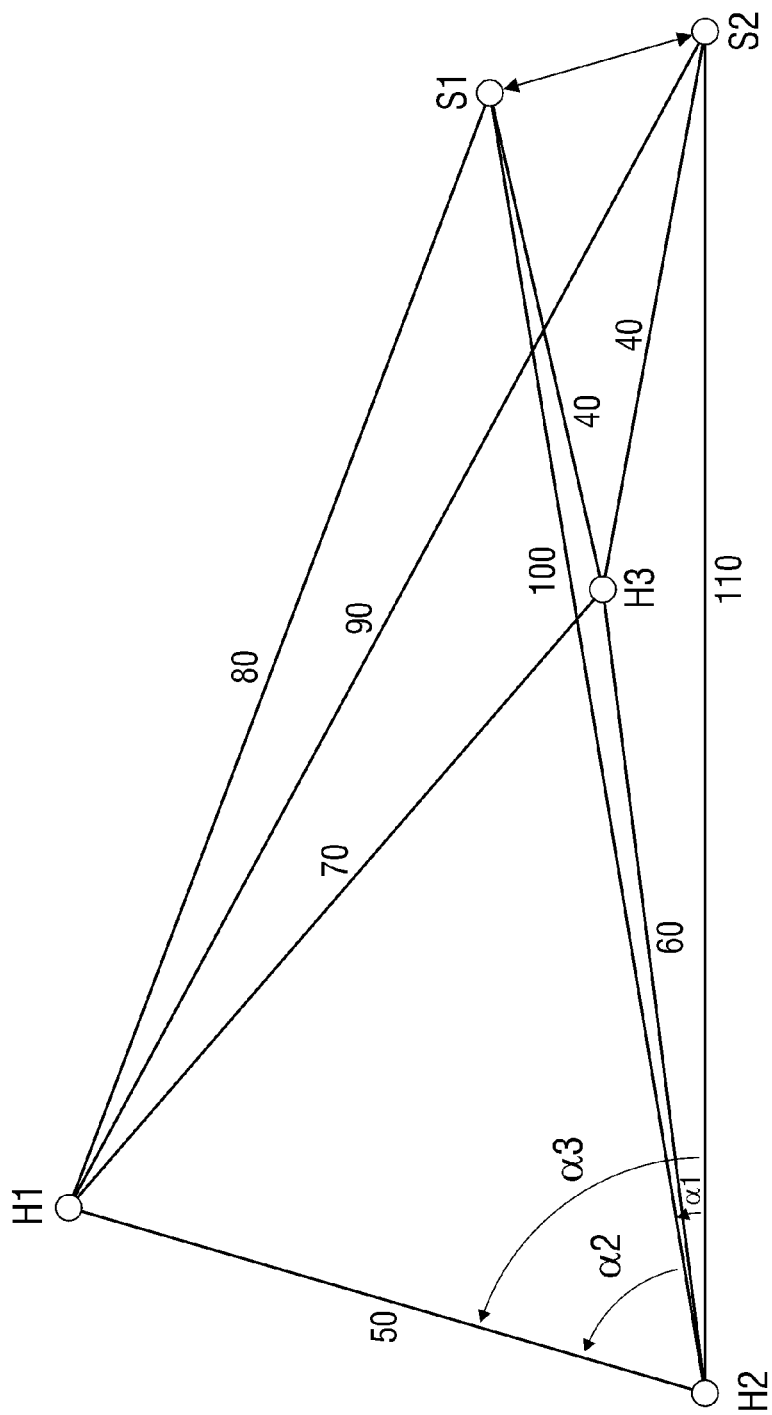
FIG. 9 is a diagram depicting the logical distance between the hosts of FIG. 8.

FIG. 9 is a diagram depicting the logical distance between the hosts of FIG. 8. The logical distance represents latency as distance/vector between nodes. Based on the property of a triangle, the latency between S1 and S2 can be calculated.

$$A1 = A3 - A2$$

$$\cos(A_g) = \frac{\overline{H_2S_2}^2 + \overline{H_2H_1}^2 - \overline{H_1S_2}^2}{2 \cdot \overline{H_2S_2} \cdot \overline{H_2H_1}} = 0.591; A_g = 0.939$$

$$\cos(A_g) = \frac{\overline{H_2S_1}^2 + \overline{H_2H_1}^2 - \overline{H_1S_1}^2}{2 \cdot \overline{H_2S_1} \cdot \overline{H_2H_1}} = 0.61, A2 = 0.9147$$

$$\cos(A_1) = 0.9997$$

Since the H3 is on the same side of H1H2 as S1 and S2:

$$\overline{S_1S_2}^2 = \overline{H_2S_2}^2 + \overline{H_2S_1}^2 - 2 \cdot \overline{H_2S_2} \cdot \overline{H_2S_1} \cdot \cos(A_1) = 106.27$$

$$\overline{S_1S_2} = 10.31 \text{ ns}$$

This algorithm can be applied recursively to all the passive hosts in the L2 environment. In this example: if the same data are hosted on H1 and S2: S1 will be directed toward S2 instead of H1. Intuitively, an operator would have directed S1 to use H1 since they are physically close. However, using the new proximity algorithm, the latency is reduced from 80 ns to 10 ns.

Figure 10:
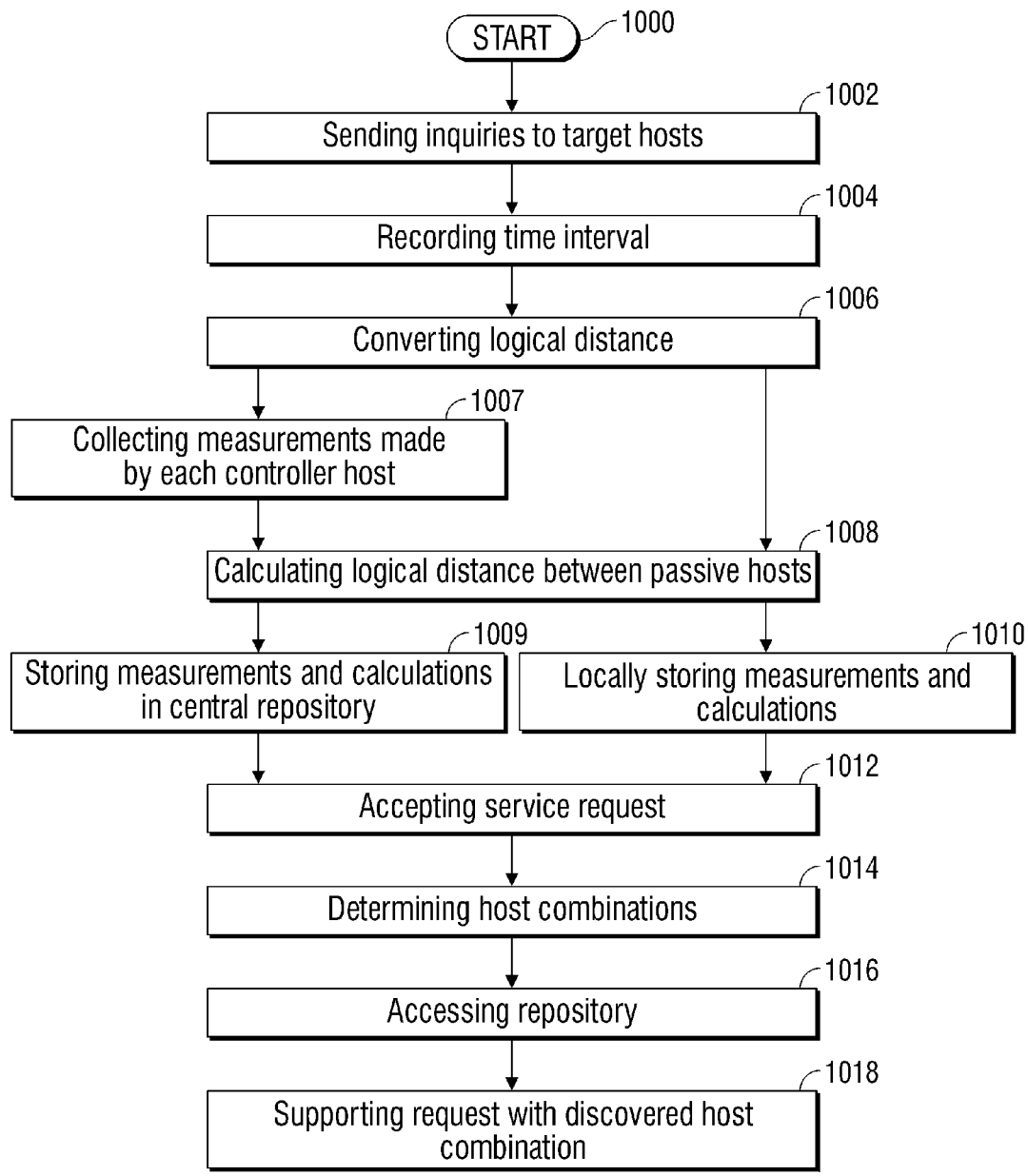
FIG. 10 is a flowchart illustrating a method for indirectly calculating proximity between passive hosts in an environment including network-connected hosts.

FIG. 10 is a flowchart illustrating a method for indirectly calculating proximity between passive hosts in an environment including network-connected hosts. Although the method is depicted as a sequence of numbered steps for clarity, the numbering does not necessarily dictate the order of the steps. It should be understood that while the step numbering generally follows the method sequence, some of these steps may be skipped, performed in parallel, or performed without the requirement of maintaining a strict order of sequence. The method starts at Step 1000.

In an environment of network-connected hosts, Step 1002 includes at least three controller host sending inquiries to target hosts in the environment. The environment includes at least two passive (non-controller) hosts. In one aspect, Layer 2 (L2) Ethernet Address Resolution Protocol (ARP) messages are sent to the target hosts. Step 1004 records a time interval between each inquiry and an associated response. Typically, the time it takes to send a message from a controller host to a target host is measured via a shortest network path. Step 1006 converts the recorded time intervals into logical distance measurements between the controller host and each target host. Step 1008 uses the logical distance measurements to calculate a logical distance between the two passive hosts. The logical distance between the two passive hosts is calculated by constructing a logical triangle between a first controller host (H1) and the two passive hosts (S1, S2) using a first logical distance side (H1S1) having a known value. A second logical distance side (H1S2) having a known value is also used, with a third logical distance side (S1S2) having an unknown value. Then, using trigonometric relationships, the unknown value of the third logical distance side is solved.

As noted above in the explanation of FIG. 6, the logical distances measured by H3 can be used to determine whether S1 and S2 are located on the same side of the H1H2 vector. If S1 and S2 are on the same side of a logical distance side H1H2, then $\alpha 1 = \alpha 3 - \alpha 2$ is determined. If S1 and S2 are on opposite sides of the logical distance side H1H2, $\alpha 1 = \alpha 3 + \alpha 2$ is determined. Knowing $\alpha 1$, H1S1, and H1S2, it is possible to solve for S1S2.

The formulas for determining $\alpha 2$ and $\alpha 3$ have been presented above in the explanation of FIG. 6. Knowing $\alpha 2$ and $\alpha 3$, $\alpha 1$ can be determined. Knowing $\alpha 1$, H1S1, and H1S2, S1S2 is determined as follows:

$$(S1S2)^2 = (H1S2)^2 + (H1S1)^2 - 2(H1S2)(H1S1)(\cos(\alpha 1)).$$

In one aspect, a first controller host collects the logical distance measurements made by each controller host in Step 1007. Then, calculating the logical distance between the two passive hosts in Step 1008 includes the first controller host making the calculations. In Step 1010 the first controller host stores the received logical distance measurements and calculations as a matrix of host IDs cross-referenced to logical distances in a local memory repository.

In another aspect, the first controller host accepts a user service request requiring the cooperation of multiple passive hosts in Step 1012. Step 1014 determines host combinations providing the requested user service. Step 1016 accesses the local memory repository to discover the host combination with the shortest logical distance between passive hosts, and Step 1018 supports the requested user service using the discovered host combination. For example, Step 1012 may accept a user service request with a requested QoS, and Step 1016 discovers the shortest logical distance in response to the requested QoS.

In a different aspect, Step 1009 stores a matrix of host IDs, cross-referenced to logical distance measurements and calculations in a central repository in the environment. Then, in Step 1016, the first controller host accesses the matrix to download logical distance measurements and discover the host combination with the shortest logical distance between passive hosts, and Step 1018 supports the requested user service using the discovered host combination.

A controller host and associated method are provided for calculating passive host proximity in an environment of network-connected hosts. Examples of particular protocols, logical distance calculation algorithms, and trigonometric relationships have been used to illustrate the invention. However, the invention is not limited to merely these examples. Other variations and embodiments of the invention will occur to those skilled in the art.

We claim:

1. In an environment including local area network (LAN) cable-connected hosts, a method for indirectly calculating logical distance between passive hosts, the method comprising:
in an environment of LAN cable-connected hosts, at least three controller hosts sending inquiries to target hosts in the environment including at least two passive (non-controller) hosts;
recording a time interval between each inquiry and an associated response;
converting the recorded time intervals into logical distance measurements between the controller host and each target host, where logical distance is a measurement of propagation delay's through LAN cabling and switching/routing speeds of intervening hosts; and
using the logical distance measurements, calculating a logical distance between the two passive hosts;
wherein calculating the logical distance between the two passive hosts includes:
constructing a logical triangle between a first controller host (H1) and the two passive hosts (S1, S2) using a first logical distance side (H1S1) having a known value, a second logical distance side (H1S2) having a known value, and a third logical distance side (S1S2) having an unknown value; and,
using trigonometric relationships, solving for the unknown value of the third logical distance side, wherein using trigonometric relationships to solve for the unknown value of the third logical distance side includes:
if S1 and S2 are on the same side of a logical distance side H1H2, finding $\alpha1=\alpha3-\alpha2$;
where $\alpha1$ is the angle formed by logical distance sides H1S1 and H1S2;
where $\alpha2$ is the angle formed by logical distance sides H1H2 and H1S1, where H2 is a second controller host;
where $\alpha3$ is the angle formed by logical distance sides H1H2 and H1S2;
if S1 and S2 are on opposite sides of the logical distance side H1H2, finding $\alpha1=\alpha3+\alpha2$; and,
knowing $\alpha1$, H1S1, and H1S2, solving for S1S2.

2. The method of claim 1 wherein recording time intervals includes measuring the time it takes to send a message from a controller host to a target host via a shortest network path.

3. The method of claim 1 wherein sending inquiries to target hosts includes sending Layer 2 (L2) Ethernet Address Resolution Protocol (ARP) messages to the target hosts.

4. The method of claim 1 wherein finding $\alpha2$ and $\alpha3$ includes:
solving for $\alpha2$ knowing logical distances H1S1, H1H2, and H2S1; and,
solving for $\alpha3$ knowing logical distances H1S2, H1H2, and H2S2.

5. The method of claim 4 wherein solving for $\alpha2$ knowing logical distances H1S1, H1H2, and H2S1 includes:
finding $\cos(\alpha2)=((H1S1)^2+(H1H2)^2-(H2S1)^2)/(2(H1S1)(H1H2))$; and,
wherein solving for $\alpha3$ knowing logical distances H1S1, H1H2, and H2S1 includes:
finding $\cos((\alpha3)=((H1S2)^2+(H1H2)^2-(H2S2)^2)/(2(H1S2)(H1H2))$.

6. The method of claim 5 wherein knowing $\alpha1$, H1S1, and H1S2, solving for S1S2 includes:
finding $(S1S2)^2=(H1S2)^2+(H1S1)^2-2(H1S2)(H1S1)(\cos(\alpha1))$.

7. The method of claim 1 further comprising:
a first controller host collecting the logical distance measurements made by each controller host;
wherein calculating the logical distance between the two passive hosts includes the first controller host making the calculations; and,
the method further comprising:
the first controller host storing the received logical distance measurements and calculations as a matrix of host IDs cross-referenced to logical distances in a local memory repository.

8. The method of claim 7 further comprising:
the first controller host accepting a user service request requiring the cooperation of multiple passive hosts;
determining host combinations providing the requested user service;
accessing the local memory repository to discover the host combination with the shortest logical distance between passive hosts; and,
supporting the requested user service using the discovered host combination.

9. The method of claim 8 wherein accepting the user service request includes accepting a user service request with a requested quality of service (QoS); and,
wherein accessing the repository to discover the host combination with the shortest logical distance between hosts includes discovering the shortest logical distance in response to the requested QoS.

10. The method of claim 1 further comprising:
storing a matrix of host IDs, cross-referenced to logical distance measurements and calculations in a central repository in the environment;
the first controller host accepting a user service request requiring the cooperation of multiple hosts;
the first controller host determining host combinations providing the requested user service;
the first controller host accessing the matrix to download logical distance measurements and discover the host combination with the shortest logical distance between passive hosts; and,
supporting the requested user service using the discovered host combination.

11. In an environment including local area network (LAN) cable-connected hosts, a controller host indirectly calculating logical distance between passive hosts, the controller host comprising:
a network interface transceiver for sending inquiries to target hosts in an environment including at least three network-connected controller hosts and at least two network-connected passive (non-controller) hosts, and for receiving logical distances measurements made by other controller hosts in the environment; and,
a proximity module, implemented by a processor, for recording a time interval between each inquiry and an associated response, converting the recorded time intervals into logical distance measurements between the controller host and target hosts, and calculating a logical distance between two passive hosts using the measured and received logical distances, where logical distance is a measurement of propagation delays through LAN cabling and switching/routing speeds of intervening hosts;
wherein the proximity module calculates the logical distance between the two passive hosts as follows:
constructing a logical triangle between a first controller host (H1) and the two passive hosts (S1, S2) using a first logical distance side (H1S1) having a known value, a second logical distance side (H1S2) having a known value, and a third logical distance side (S1S2) having an unknown value; and, using trigonometric relationships, solving for the unknown value of the third logical distance side; and, wherein the proximity module uses trigonometric relationships to solve for the unknown value of the third logical distance side follows:

if S1 and S2 are on the same side of a logical distance side H1H2, finding $\alpha1=\alpha3-\alpha2$;

where $\alpha1$ is the angle formed by logical distance sides H1S1 and H1S2;

where $\alpha2$ is the angle formed by logical distance sides H1H2 and H1S1, where H2 is a second controller host;

where $\alpha3$ is the angle formed by logical distance sides H1H2 and H1S2;

if S1 and S2 are on opposite sides of the logical distance side H1H2, finding $\alpha1=\alpha3+\alpha2$; and, knowing $\alpha1$, H1S1, and H1S2, solving for S1S2.

12. The controller host of claim 11 wherein the proximity module measures the time it takes to send a message from the controller host to a target host via a shortest network path.

13. The controller host of claim 11 wherein the transceiver sends Layer 2 (L2) Ethernet Address Resolution Protocol (ARP) messages to the target hosts.

14. The controller host of claim 11 wherein the proximity module finds $\alpha2$ and $\alpha3$ as follows:

solving for $\alpha2$ knowing logical distances H1S2, H1H2, and H2S1; and, solving for $\alpha3$ knowing logical distances H1S2, H1H2, and H2S2.

15. The controller host of claim 14 wherein the proximity module solves for $\alpha2$ knowing logical distances H1S1, H1H2, and H2S1 as follows:

finding $\cos(\alpha2)=((H1S1)^2+(H1H2)^2-(H2S1)^2)/(2(H1S1)(H1H2))$; and, wherein the proximity module solves for $\alpha3$ knowing logical distances H1S1, H1H2, and H2S1 as follows:

finding $\cos((\alpha3)=((H1S2)^2+(H1H2)^2-(H2S2)^2)/(2(H1S2)(H1H2))$.

16. The controller host of claim 15 wherein the proximity module, knowing $\alpha1$, H1S1, and H1S2, solving for S1S2 as follows:

finding $(S1S2)^2=(H1S2)^2+(H1S1)^2-2(H1S2)(H1S1)(\cos(\alpha1)$.

17. The controller host of claim 11 further comprising:

a local memory repository for storing the received logical distance measurements made by other controller hosts in the environment, arid proximity module calculations, as a matrix of host IDs cross-referenced to logical distances.

18. The controller host of claim 17 further comprising:

a user interface (UI) module for accepting a user service request requiring the cooperation of multiple passive hosts;

wherein the proximity module determines host combinations providing the requested user service, and accesses the local memory repository to discover the host combination with the shortest logical distance between passive hosts; and, wherein the UI module supports the requested user service using the discovered host combination.

19. The controller host of claim 18 wherein the UI module accepts a user service request with a requested quality of service (QoS); and, wherein the proximity module discovers the shortest: logical distance in response to the requested QoS.

20. The controller host of claim 11 further comprising:

a UI module for accepting a user service request requiring the cooperation of multiple passive hosts;

wherein the transceiver transmits logical distance measurements to a network-connected central repository matrix of host IDs, cross-referenced to logical distance measurements;

wherein the proximity module determines host combinations providing the requested user service, accesses the central repository matrix to download measured logical distances, and discover the host combination with the shortest logical distance between passive hosts; and, wherein the UI module supports the requested user service using the discovered host combination.

* * * * *